(12) United States Patent
Kyosti et al.

(10) Patent No.: US 7,043,678 B2
(45) Date of Patent: May 9, 2006

(54) METHOD FOR IDENTIFYING BAD FRAMES

(75) Inventors: Pekka Kyosti, Oulu (FI); Mikko Saily, Oulu (FI)

(73) Assignee: Nokia Corporation, Espoo (FI)

( * ) Notice: Subject to any disclaimer, the term of this patent is extended or adjusted under 35 U.S.C. 154(b) by 348 days.

(21) Appl. No.: 10/106,860

(22) Filed: Mar. 22, 2002

(65) Prior Publication Data

US 2002/0166092 A1    Nov. 7, 2002

Related U.S. Application Data

(63) Continuation of application No. PCT/EP99/07597, filed on Oct. 11, 1999.

(51) Int. Cl.
*H03M 13/00*    (2006.01)

(52) U.S. Cl. .................... 714/758; 714/746; 704/200; 706/14; 375/341

(58) Field of Classification Search ............... 704/200; 706/14; 714/704, 946, 752; 375/341
See application file for complete search history.

(56) References Cited

U.S. PATENT DOCUMENTS

| | | | |
|---|---|---|---|
| 5,142,551 A | * | 8/1992 | Borth et al. ............... 375/219 |
| 5,754,586 A | * | 5/1998 | Carsello .................... 375/213 |
| 5,815,507 A | * | 9/1998 | Vinggaard et al. .......... 714/704 |
| 5,864,589 A | * | 1/1999 | Mourot et al. ............. 375/341 |
| 6,182,022 B1 | * | 1/2001 | Mayle et al. ............... 702/182 |
| 6,208,699 B1 | * | 3/2001 | Chen et al. ................ 375/340 |
| 6,483,881 B1 | * | 11/2002 | Kim et al. .................. 375/341 |

FOREIGN PATENT DOCUMENTS

| | | |
|---|---|---|
| EP | 0805572 | 11/1997 |
| EP | 0805572 A3 * | 11/1997 |
| FR | 2720208 | 5/1994 |

* cited by examiner

*Primary Examiner*—Guy Lamarre
*Assistant Examiner*—John P. Trimmings

(57) ABSTRACT

The present invention discloses a method and device for identifying unusable data blocks (bad frames) during communication in a network. The method comprises the steps of determining (S1) a classifier (CL_C) in a current data block, calculating (S3) a mean (M) of classifiers (CL_1 to CL_N) of a predetermined number (N) of data blocks, calculating (S4) a standard deviation ($\sigma$) of the classifiers (CL_1 to CL_N), calculating (S5) a threshold for identifying bad frames on the basis of the mean (M) and the standard deviation ($\sigma$) of the classifiers (CL_1 to CL_N), and distinguishing (S6) whether the current data block is usable or not on the basis of a comparison of the threshold (TH) and the current classifier (CL_C). By the method and the device, changing conditions of a radio channel can be taken into account quickly.

6 Claims, 3 Drawing Sheets

METHOD FOR IDENTIFYING BAD FRAMES

CROSS-REFERENCE TO RELATED APPLICATION

This application is a continuation of International Application PCT/EP99/07597 having an international filing date of Oct. 11, 1999 and from which priority is claimed under all applicable sections of Title 35 of the United States Code including, but not limited to, Sections 120, 363 and 365(c).

FIELD OF THE INVENTION

The present invention relates to a method and a device for identifying unusable data blocks during communication in a network.

BACKGROUND OF THE INVENTION

Communication between a mobile station and a base station is always affected by interference, noise and the like. Especially in the case of a digital communication, such communication errors can cause serious distortions of the use signal. Thus, in order to provide a reliable communication, the signals are coded.

Preferably, the codes used are so-called error correcting codes by which an error can be detected and corrected. Block codes are one class of error correcting codes. In block codes, a predetermined amount of bits are combined to one block and then subjected to some encoding, for example a parity check or the like. An important block code is the cyclic redundancy check (3 bit CRC), for example.

However, such a block code like the CRC alone is not adequate to identify all errors on important bits in a data stream. Consequently, it is possible that bad frames containing such bit errors are not detected which leads to decreased speech quality.

Therefore, the data are also protected by a so-called convolutional code. In convolutional codes, a stream of data bits is encoded successively by (for example) modulo-2 convolutions. The bits are coded such that a new sequence of bits is generated in which the bits are dependent on each other. This allows a more reliable decoding.

Thus, in order to provide good speech quality, the block code and the convolutional code are applied simultaneously.

In the following an example for the coding of speech frames is described with respect to FIG. 3. In GSM (Global System for Mobile Communications) the speech channel at half rate (TCH/HS) is coded in the following way: A speech coder supplies a sequence of blocks of data to a channel encoder, each block of data corresponding to one speech frame. The bits of such a data block are divided into two classes, i.e., class 1 bits and class 2 bits. Class 1 comprises protected bits, whereas class 2 comprises unprotected bits. Class 1 is further subdivided into a class 1a and a class 1b. Class 1a bits are protected by a cyclic code and a convolutional code, whereas class 1b bits are protected by the convolutional code only. Thus, the class 1a bits are the most important bits in the data block.

The channel encoder performs a parity check (using CRC) and the like in order to protect the class 1a bits. Thereafter, the class 1 bits (i.e., class 1a bits and class 1b bits) are encoded with a punctured convolutional code. On the receiver side, the received coded data are decoded.

By such a code, a lot of transmission errors can be detected and corrected. Thus, a highly reliable communication can be provided.

However, there is always the possibility of errors to such an extent that these errors can be detected but are not correctable, e.g., since too many bits were affected during the transmission. In this case, a corresponding data block (frame) has to be indicated. This is referred to as the so-called bad frame indication (BFI).

By this procedure, a BFI flag is set in the data block. When the BFI flag is active, a successive device knows that this particular speech frame is not usable. Thus, a voice output, for example, is avoided.

The conventional bad frame indication (BFI) algorithms have the drawback that they are inflexible such that they cannot respond to changing conditions on a communication channel.

This leads to the drawback of a large amount of incorrect decisions. That is, some bad frames are not detected and thus, on the other hand, some frames are marked as bad frames although they do not comprise a communication error.

SUMMARY OF THE INVENTION

Thus, the object underlying the invention is to provide a method and a device by which an algorithm for identifying unusable data blocks (bad frames) can be applied which adapts to varying communication channel conditions.

This object is solved by a method for identifying unusable data blocks during communication in a network. The method comprises the steps of determining a classifier in a current data block, calculating a mean of classifiers of a predetermined number of data blocks, calculating a standard deviation of the classifiers, calculating a threshold for identifying bad frames on the basis of the mean and the standard deviation of the classifiers, and distinguishing whether the current data block is usable or not on the basis of a comparison of the threshold and the current classifier.

Furthermore, the above object is solved by a device for identifying unusable data blocks during communication in a network, comprising a classifier determining means adapted to determine a current classifier in a current data block, a threshold calculating means which is adapted to calculate a mean value of classifiers of a predetermined number of data blocks, to calculate a standard deviation of the classifiers, and to calculate a threshold for identifying bad frames on the basis of the mean value and the standard deviation of the classifiers, and a distinguishing means which is adapted to distinguish whether the current data block is usable or not on the basis of a comparison of the threshold and the current classifier.

The algorithm according to the present invention described above adapts better to different channel conditions than the previous algorithms. This is expressed in that the algorithm according to the embodiment finds bad frames well enough, and, in addition, makes considerably less incorrect decisions, i.e., rejects fewer good frames. Especially with a low signal-to-noise ratio, the amount of rejected good frames can be considerably large when using the algorithm according to the prior art. In contrast thereto, this can be avoided with the algorithm according to the present invention. That is, with the algorithm according to the invention, an improvement in sensitivity can be achieved since less good frames are identified as bad frames.

Furthermore, the algorithm according to the present invention requires considerably less code and calculations than conventional algorithm, like the so-called pseudo BER (bit error rate) algorithm or the like.

Moreover, the proposed method also works with recursive convolutional codes unlike the pseudo BER algorithm.

Further advantageous developments are defined in the dependent claims.

BRIEF DESCRIPTION OF THE DRAWINGS

The present invention will be more readily understood with reference to the accompanying drawings in which.

DETAILED DESCRIPTION OF PREFERRED EMBODIMENTS

Figure 1:
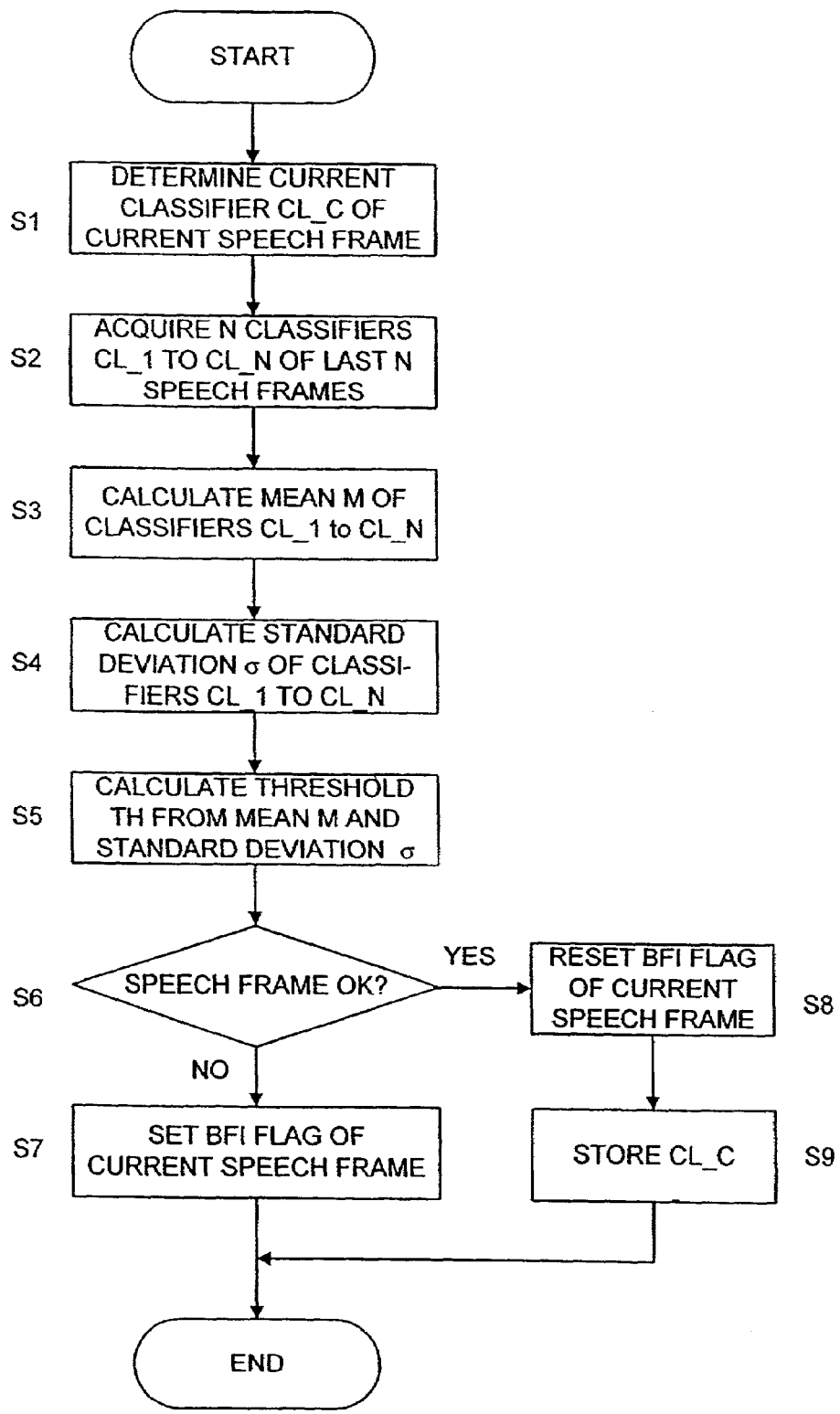
FIG. 1 shows a flow chart showing a procedure for identifying bad frames according to one embodiment of the invention.

In the following, a preferred embodiment of the invention is described in more detail with reference to the accompanying drawings.

In short, the method according to the invention is based on soft bits produced by a receiver. As a classifier, a mean value of the selected k smallest class 1a soft-bits of a data block (e.g., a speech frame) is used. The rejection threshold is derived from the standard deviation and the mean of the classifiers of a plurality of data blocks.

It is noted that soft bits (soft values) mean the soft output of the channel decoder. Soft values are not zeros and ones, but they are 8 bit integers where the first bit stands for the sign of the number (1 for negative and 0 for positive). The remaining 7 bits indicate the reliability of that first bit. So, the soft value 126 indicates a zero with a high reliability, whereas the soft value −3 indicates a one with a low reliability.

The classifier can be determined in the following way: Among received and decoded soft bits (i.e., bits with probability/likelihood value, as mentioned above) of one speech block (112 in GSM Half Rate case and 260 in Full Rate case), k soft bits from class 1a bits with the smallest absolute values are selected and their mean is calculated. The mean is the classifier of current speech block.

For example, soft bits can be extracted from a convolutional code which uses a Viterbi decoder as a decoding algorithm. A maximum likelihood path through Viterbi trellis is formed by decision metric values, which can be taken as soft bits. Hard decisions are made according to those soft bits (soft bits→hard bits). It is noted that hard bits are—in contrast to soft bits—either 1 or 0.

Furthermore, it is noted that the algorithm for obtaining soft bits is not limited to Viterbi. Any error correcting code and any decoding algorithm can be used as long as it can produce soft bits as output.

In general, a radio channel is a stationary LTV (Linear Time-Variant) system, such that its influence on transmitted digital data signals, i.e., symbols, can be estimated statistically. When noise and fading profile affects in an unknown way, the quotient of the above-mentioned standard deviation and mean standardizes statistical properties of the channel to the threshold value of the classifier.

In the following, the method according to the preferred embodiment is described in more detail with reference to a flow chart shown in FIG. 1.

The procedure shown in this flow chart serves to identify bad frames in a speech communication. Thus, the data blocks to be checked are speech data blocks, in the following referred to as speech frames. The procedure is started every time a new speech frame is received.

First, in step S1, a classifier CL_1 of the current speech frame is determined. For the determination, soft bits produced by a receiver are used.

As mentioned above, for obtaining the soft bits, a receiver comprising a Viterbi decoder or a Maximum-likelihood Receiver can be used which is adapted to decode a digital signal encoded by a convolution code. In particular, in this case, the detection is based on minimum metric information extracted from the soft bits produced by the receiver. Nevertheless, also other suitable receiver can be used which can produce soft bits.

Minimum metric information extracted from the decoder of the receiver is side information of the decoded bit. This side information represents the reliability of a decoded bit. That is, a large value indicates a good reliability (large probability of a correct bit decision), whereas a small value indicates a poor reliability (small probability of a correct bit decision).

A soft bit mentioned above is composed of a hard bit (i.e., 1 or 0) and the minimum metric information (reliability). Thus, the minimum metric information can be extracted from a soft bit by taking the absolute value of it.

The classifier CL_1 of the current speech frame can be the mean value (i.e., the mean signal strength) of the smallest 1a soft-bits. Of course, also only the value (i.e., signal strength) of the lowermost class 1a bit can be taken as the classifier. However, a mean value gives a more reliable result.

In step S2, classifiers CL_1 to CL_N of N previous speech frames are acquired from a memory. Then, in step S3, the mean value M of the previous classifiers CL_1 to CL_N is calculated. In step S4 the standard deviation σ of the previous classifiers CL_1 to CL_N is calculated.

In step S5, from the calculated mean value M and standard deviation σ of the last N classifiers, a rejection threshold TH is calculated according to the following formula:

$$TH = M \cdot \left(a - b \cdot \frac{\sigma}{M}\right)$$

The values a and b are constants and can be chosen in accordance with a particular system.

Thus, the threshold TH calculated in this manner depends on the current speech frame and also on previous speech frames. Hence, the history of the speech frame transmission on this particular radio channel is considered.

In step S6, the thus calculated threshold TH is used to check whether the current speech frame is satisfactory or not, i.e., whether the current speech frame has to be marked as a bad frame or not. This is performed by comparing the current classifier CL_C with the calculated threshold TH.

In detail, it is checked whether the signal strength of the current speech frame indicated by the current classifier CL_C is equal or higher than the calculated threshold TH.

In case the current speech frame is not satisfactory (NO in step S6), i.e., in case CL_C<TH, the BFI flag of the current speech frame is set (BFI flag=1) in step S7. Then, successive devices can recognise that this block is a bad frame and its audible output should be avoided, for example. After this, the procedure for the current speech frame is ended.

On the other hand, in case the current speech frame is satisfactory (YES in step S6), i.e., in case CL_C≧TH, the BFI flag of the current speech frame is reset (BFI flag=0) in step S8. Then, the classifier CL_C is stored (step S9) such that it can be used later for following speech frames as a classifier of the above-mentioned classifiers CL_1 to CL_N.

Figure 2:
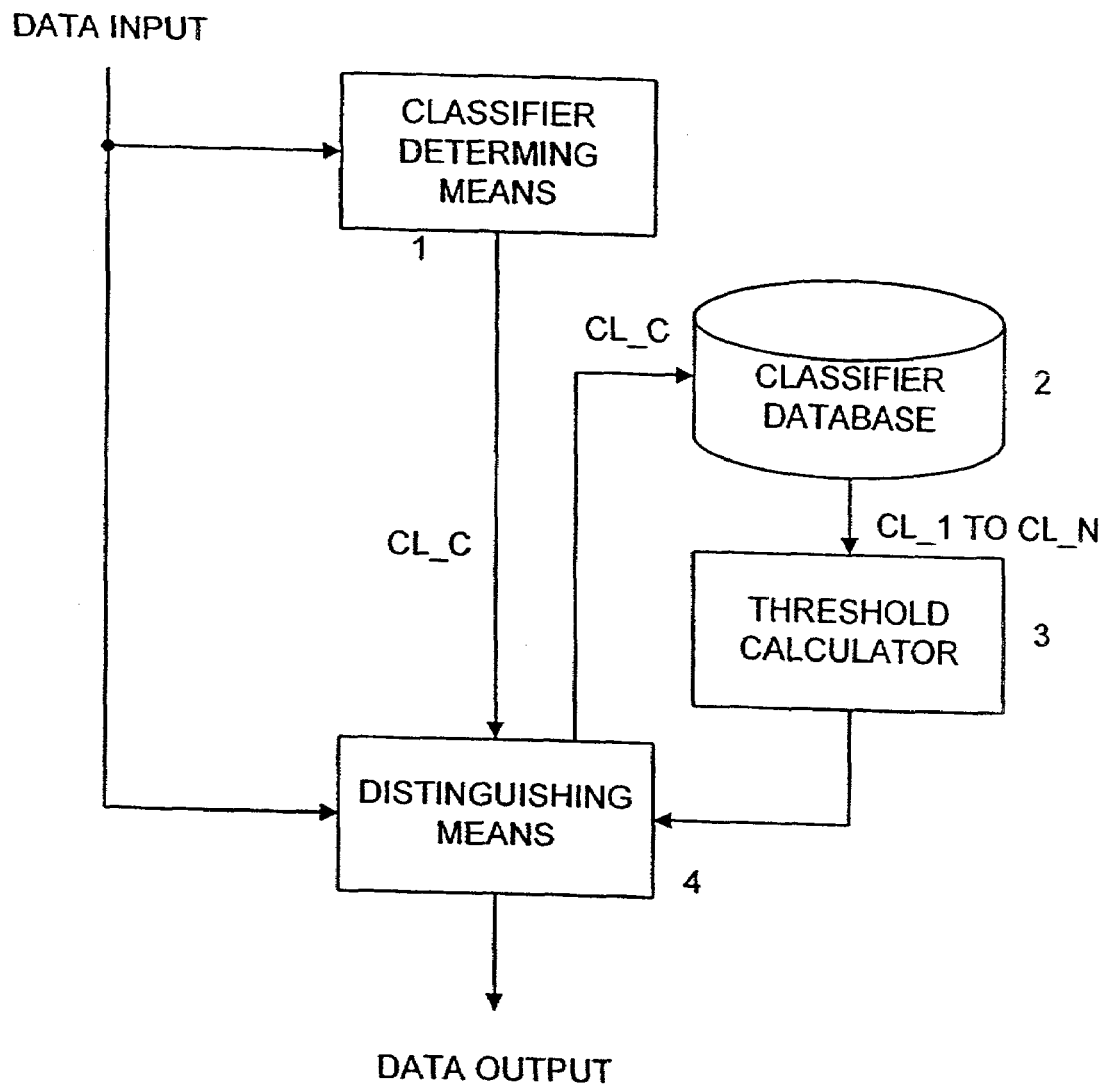
FIG. 2 shows a block diagram of a device for carrying out the method according to the embodiment.
Figure 3:
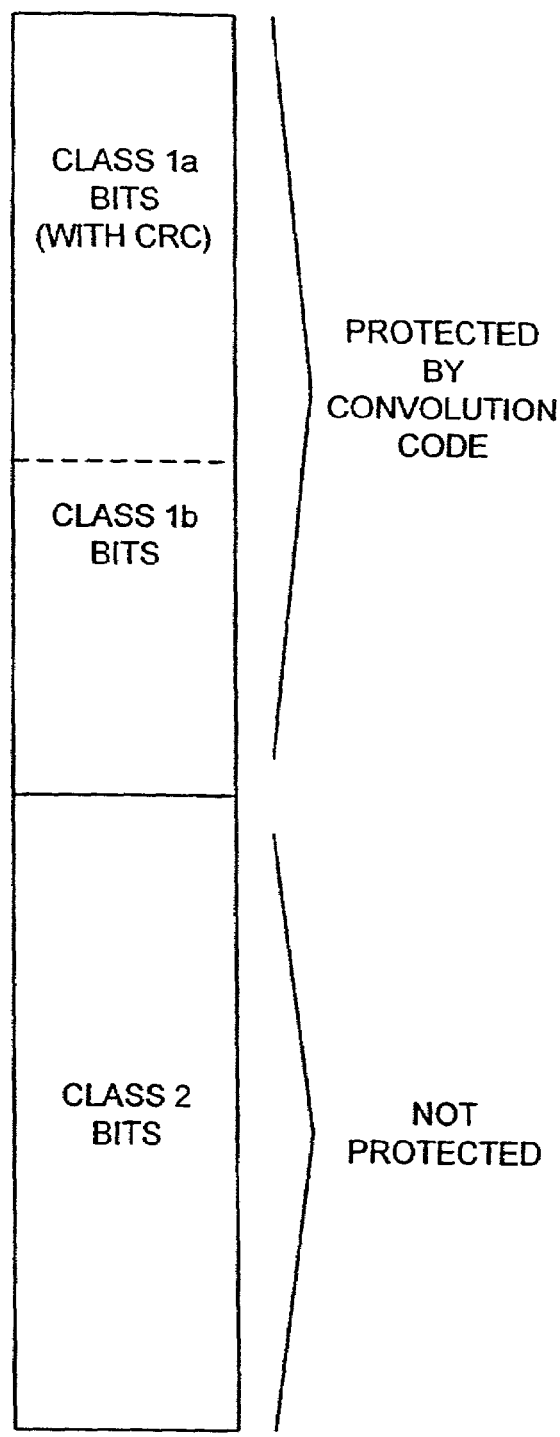
FIG. 3 shows an example for a data block comprising class 1a bits, class 1b bits and class 2 bits.

FIG. 2 shows a BFI (bad frame identifying) device according to the present embodiment which is adapted to carry out the above described procedure. It is noted that this device can be incorporated in any suitable network element which receives and/or decodes transmitted digital signals.

On the input side, speech frames received via a receiver or the like are supplied to a classifier determining means 1. This classifier determining means 1 determines the current classifier CL_C of the current speech frame as described above with respect to step S1. The classifier determining means 1 supplies the determined classifier CL_1 to a distinguishing means (identifying means) 4 which will be described later.

Reference numeral 2 denotes a classifier database. The database 2 serves to store a plurality of classifiers. Preferably, the database comprises a non-volatile RAM (random access memory) or the like which allows a fast access. However, other appropriate memory devices can also be used, for example an EEPROM (electrically erasable, programmable read-only memory).

Reference numeral 3 denotes a threshold calculator. The threshold calculator 3 acquires the classifiers CL_1 to CL_N of the last N speech frames including the current speech frame from the database 2. The threshold calculator 3 carries out the processes described above with respect to steps S2 to S5.

The threshold TH calculated by the threshold calculator 3 is supplied to the distinguishing means 4 which identifies bad frames (i.e., unusable speech frames) by performing the check described above with respect to step S6.

Furthermore, the distinguishing means 4 sets or resets the BFI flag of the checked speech frame, depending on the check result. In case that the current speech frame is identified as a usable speech frame, the current classifier CL_C is stored in the classifier database 2 such that it can be used later for following speech frames.

The above described classifier determining means 1, the threshold calculator 3 and the distinguishing means 4 can each be constituted by a microcomputer, respectively, comprising a CPU (central processing unit), a RAM and a ROM (read-only memory), for example. As an alternative, all these means can be constituted by a single microcomputer.

The algorithm according to the present embodiment described above adapts better to different channel conditions than the previous algorithm. This is expressed in that the algorithm according to the embodiment finds bad frames well enough, and, in addition, makes considerably less incorrect decisions, i.e., rejects fewer good frames. Especially with a low signal-to-noise ratio, the amount of rejected good frames can be considerably large when using the algorithm according to the prior art.

By the proposed algorithm and structure, bad frames can be found reliably in different static and fading conditions, since it can adapt to static, frequency selective and time selective radio channels.

Furthermore, the algorithm according to the present embodiment requires considerably less code and calculations than a conventional algorithm, like the so-called pseudo BER algorithm or the like.

The above description and accompanying drawings only illustrate the present invention by way of example. Thus, the embodiments of the invention may vary within the scope of the attached claims.

The invention claimed is:

1. A method for identifying unusable data blocks during communication in a network, comprising the steps of
    determining a current classifier in a current data block, wherein said current classifier is determined based on minimum metric information extracted from class $1a$ soft bits produced by a receiver;
    calculating a mean value of classifiers of a predetermined number of data blocks previous to said current data block;
    calculating a standard deviation of said classifiers;
    calculating a threshold for identifying bad frames on the basis of said mean value and said standard deviation of said classifiers of said data blocks previous to said current data block, said threshold being calculated by the formula: threshold=mean×(a−b×standard deviation/mean), wherein a and b are constant values; and
    distinguishing whether said current data block is usable or not on the basis of a comparison of said threshold and said current classifier.

2. The method according to claim 1, further comprising a step of resetting or setting an indication flag of said current data block depending on the result of said distinguishing step.

3. The method according to claim 1, further comprising a step of
    storing said current classifier in case said current data block is distinguished as a usable data block in said distinguishing step.

4. A device for identifying unusable data blocks during communication in a network, comprising
    a classifier determining means adapted to determine a current classifier in a current data block based on minimum metric information extracted from class $1a$ soft bits produced by a receiver;
    a threshold calculating means which is adapted to calculate a mean value of classifiers of a predetermined number of data blocks previous to said current data block and to calculate a standard deviation of said classifiers,
    said threshold calculating means being further adapted to calculate a threshold for identifying bad frames on the basis of said mean value and said standard deviation of said classifiers by the formula: threshold=means×(a−b×standard deviation/mean), wherein a and b are constant values; and
    a distinguishing means which is adapted to distinguish whether said current data block is usable or not on the basis of a comparison of said threshold and said current classifier.

5. The device according to claim 4, wherein said distinguishing means is further adapted to reset or set an indication flag of said current data block depending on the distinguishing result.

6. The device according to claim 4, further comprising a data base in which said classifiers are stored, wherein
    said distinguishing means is further adapted to store said current classifier in said database in case said current data block is distinguished as a usable data block.

* * * * *